US008391807B2

(12) United States Patent
Seshadri

(10) Patent No.: US 8,391,807 B2
(45) Date of Patent: Mar. 5, 2013

(54) COMMUNICATION DEVICE WITH REDUCED NOISE SPEECH CODING

(75) Inventor: Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/589,329

(22) Filed: Aug. 20, 2012

(65) Prior Publication Data

US 2012/0310634 A1 Dec. 6, 2012

Related U.S. Application Data

(62) Division of application No. 12/643,577, filed on Dec. 21, 2009, now Pat. No. 8,260,220.

(60) Provisional application No. 61/246,279, filed on Sep. 28, 2009.

(51) Int. Cl.
*H04B 1/04* (2006.01)

(52) U.S. Cl. ...... 455/114.2; 455/570; 455/91; 455/63.1; 455/135; 704/200.1; 704/247; 704/253; 704/268; 370/406.01; 370/406.05; 370/406.06; 370/406.16

(58) Field of Classification Search .................. 455/570, 455/91, 114.2, 63.1, 135, 222, 296; 704/200.1, 704/201, 207, 208, 219–220, 247, 253, 268; 379/406.01, 406.05, 406.06, 406.16
See application file for complete search history.

(56) References Cited

U.S. PATENT DOCUMENTS

| | | | | |
|---|---|---|---|---|
| 2002/0035470 | A1 * | 3/2002 | Gao | 704/226 |
| 2008/0140422 | A1 * | 6/2008 | Hovestadt et al. | 704/275 |
| 2008/0208575 | A1 * | 8/2008 | Laaksonen et al. | 704/225 |

* cited by examiner

*Primary Examiner* — Tuan Pham
(74) *Attorney, Agent, or Firm* — Garlick & Markison; Bruce E. Garlick

(57) ABSTRACT

A communication device includes memory, an input interface, a processing module, and a transmitter. The processing module receives a digital signal from the input interface, wherein the digital signal includes a desired digital signal component and an undesired digital signal component. The processing module identifies one of a plurality of codebooks based on the undesired digital signal component. The processing module then identifies a codebook entry from the one of the plurality of codebooks based on the desired digital signal component to produce a selected codebook entry. The processing module then generates a coded signal based on the selected codebook entry, wherein the coded signal includes a substantially unattenuated representation of the desired digital signal component and an attenuated representation of the undesired digital signal component. The transmitter converts the coded signal into an outbound signal in accordance with a signaling protocol and transmits it.

20 Claims, 11 Drawing Sheets

COMMUNICATION DEVICE WITH REDUCED NOISE SPEECH CODING

CROSS REFERENCE TO RELATED PATENTS

The present U.S. Utility patent application claims priority pursuant to 35 U.S.C. §121, as a divisional, to U.S. Utility application Ser. No. 12/643,577, entitled, “Communication Device with Reduced Noise Speech Coding”, filed Dec. 21, 2009, to be issued as U.S. Pat. No. 8,260,220, which claims priority under 35 U.S.C. §119(e) to U.S. Provisional Application No. 61/246,279, entitled, “Communication Device with Reduced Noise Speech Coding”, filed Sep. 28, 2009, both of which are incorporated herein in their entirety by reference for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication systems and more particularly to communication devices within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers data from the filtered signals in accordance with the particular wireless communication standard.

As is also known, the transmitter includes a data modulation stage, one or more intermediate frequency stages, and a power amplifier. The data modulation stage converts data into baseband signals in accordance with a particular wireless communication standard. The one or more intermediate frequency stages mix the baseband signals with one or more local oscillations to produce RF signals. The power amplifier amplifies the RF signals prior to transmission via an antenna.

The data modulation stage includes a plurality of functional blocks that are standard specific to convert data into the baseband signals. For instance, many cellular communication standards require speech coding, as such, the data modulation stage includes a speech coding functional block. In general, speech coding models digital speech signals by using audio signal processing and speech parameter estimations. The speech parameter estimations are based on the known psychoacoustics of the human auditory system such that the intelligibility of the speech is preserved. One specific criteria for speech coding is that it should have low coding delays since long coding delays would interfere with the intelligibility of a cellular communication.

Code excited linear predication (CELP) is a commonly used speech coding scheme in cellular communications. CELP has four main components: linear prediction, codebooks, searching, and quantization. The codebooks, which may be adaptive and/or fixed, contain a plurality of modeled sound samples. A linear prediction model utilizes inputs from the codebooks to make estimations of speech signals, which may be done by performing a closed loop search in a perceptually weighted domain. A vector quantization function is applied to the resulting estimations to produce the coded speech.

While speech coding works well to compress data and generally improve the performance of a cellular communication device, there are some issues. For example, when a cellular communication device is used in a noisy environment, its audio input circuitry (e.g., microphone and audio coded) receives and captures analog voice signals and the background noise. As such, the resulting digital speech signals include a voice component and a noise component. In this instance, the “noisy” digital speech signals are speech encoded and the noise is passed along with the desired voice signals. A "noisy" encoded digital speech signal can adversely affect the usefulness of a cellular communication device.

Therefore, a need exists for a communication device that has reduced noise speech coding.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
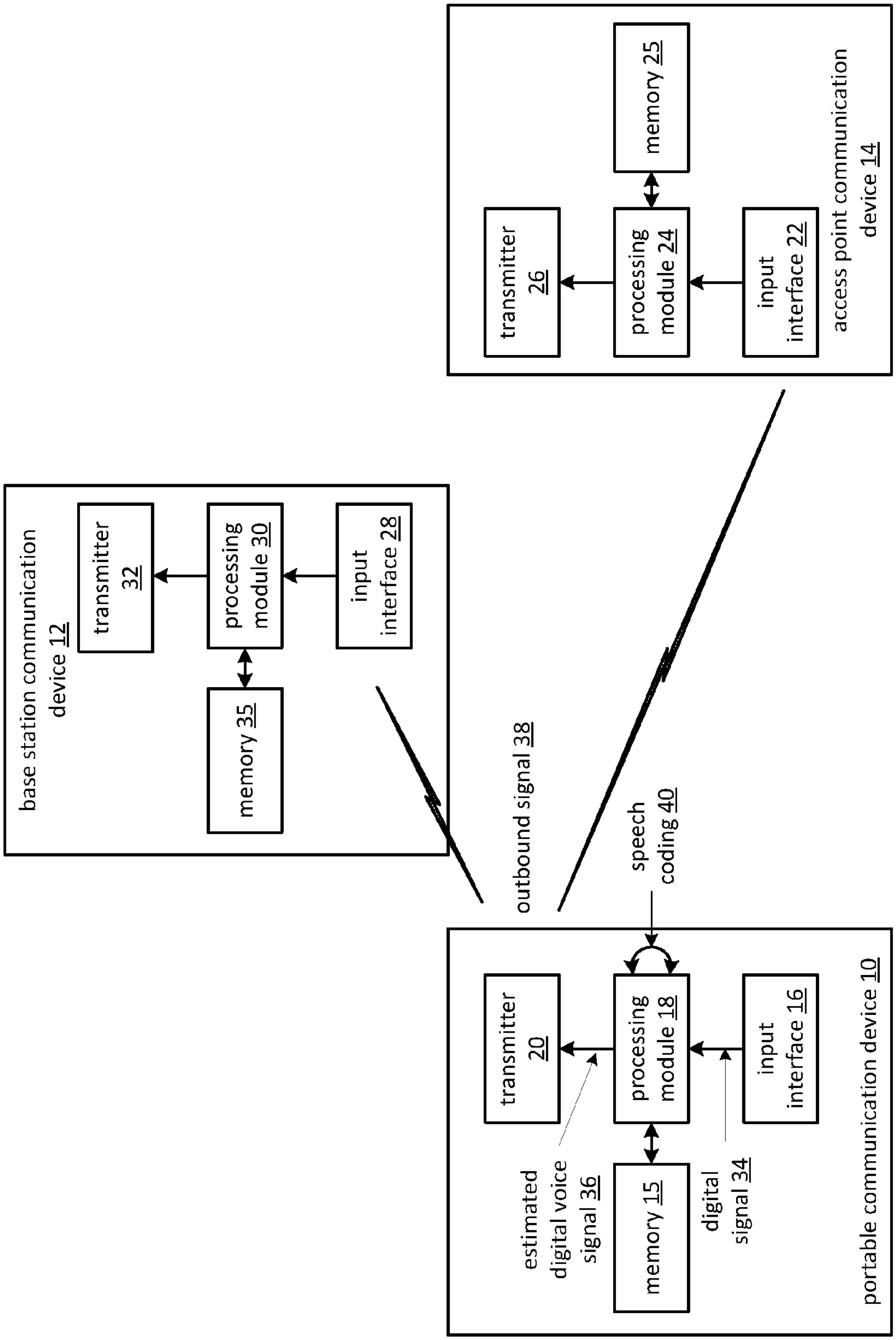
FIG. 1 is a schematic block diagram of an embodiment of a plurality of communication devices in accordance with the present invention.

FIG. 1 is a schematic block diagram of an embodiment of a plurality of communication devices 10-14. One or more of the communication devices may be portable communication devices 12; one or more of the communication devices may be base stations 12; and/or one or more of the communication devices may be access points 14. A portable communication device 10 may be a cellular telephone, a personal digital assistant, a portable video game unit, a two-way radio, a portable video and/or audio player, a portable medical monitoring and/or treatment device, and/or any other handheld electronic device that receives inputs from a user and provides corresponding outputs of audio data, video data, tactile data, text data, graphics data, and/or a combination thereof.

Each of the communication devices 10-14 includes a processing module 18, 24, 30, memory 15, 25, 35, an input interface 16, 22, 26, and a transmitter 20, 26, 32. Each of the processing modules 18, 24, 30 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-14.

The input interface 16, 22, 28 may be a wired communication interface module or a wireless communication interface module. Such an interface module includes hardware (e.g., one or more of wires, connectors, wireless transceivers, drivers, buffers, voltage level shifters, etc.) and/or software (e.g., one or more software drivers, etc.) that provides the electrical, mechanical, and/or functional connection to an input device (e.g., microphone, wireless network connection, wired network connection, wireless cellular voice and/or data transceiver, memory storing one or more digital audio and/or video files, etc.).

In an example of operation, the processing module 18 of the portable communication device 10 receives a digital audio signal 34 from the input interface 16, which includes one or more of an amplifier, analog to digital converter, an audio digital processing functional module (e.g., A-law, μ-law, pulse code modulation (PCM), a software driver, etc.). For example, the input interface 16 may receive an analog voice signal from a microphone, which it converts into the digital audio signal 34. Note that the digital audio signal 34 includes a digital voice component and a digital noise component.

The processing module 18 performs speech coding 40 on the digital audio signal 34 to produce an estimated digital voice signal 36 that has less noise than the digital audio signal 34. In an embodiment, the processing module 18 performs the speech coding 40 by identifying one of a plurality of codebooks (which may be stored in memory 15) based on the undesired digital signal component. For example, when the undesired digital signal component (e.g., noise) is small (e.g., have a relatively high signal-to-noise ratio (SNR)), the processing module selects a high resolution codebook (e.g., 16 Kbit, 32 Kbit or higher bit codebook). As another example, when the undesired digital signal component is larger (e.g., have a smaller SNR), the processing module selects a lower resolution codebook (e.g., 8 Kbit, 4 Kbit, or lower bit codebook).

Having identified the codebook, the processing module then identifies a codebook entry from the identified codebook based on the desired digital signal component to produce a selected codebook entry. The processing module then generates a coded signal based on the selected codebook entry, wherein the coded signal includes a substantially unattenuated representation of the desired digital signal component and an attenuated representation of the undesired digital signal component. For example, the processing module 18 selects an entry in the codebook that produces the coded signal to accurately represent the digital audio signal being currently processed. Note that the coding of the digital audio signal is done in small time increments (e.g., fractions of a millisecond to tens of milliseconds). Further note that the identifying of the codebook and the entry thereof may be an iterative process (e.g., back and forth between codebooks to identify one or more entries that accurately represent the digital audio signal with an attenuated undesired signal component).

The processing module 18 forwards the coded signals as an estimated digital voice signal 36 to the transmitter 20. The transmitter 20 converts the estimated digital voice signal 36 into an outbound signal 38 and transmits it to the base station 12 for cellular communications and/or to the access point 14 for voice over IP communications. Note that the transmitter 20 may be included in a radio frequency (RF) transceiver, which also includes a receiver coupled to the processing module 18. Further note that the communication device may include one or more integrated circuits that support one or more of the memory 15, the input interface 16, the processing module 18, and the transmitter 20.

Figure 2:
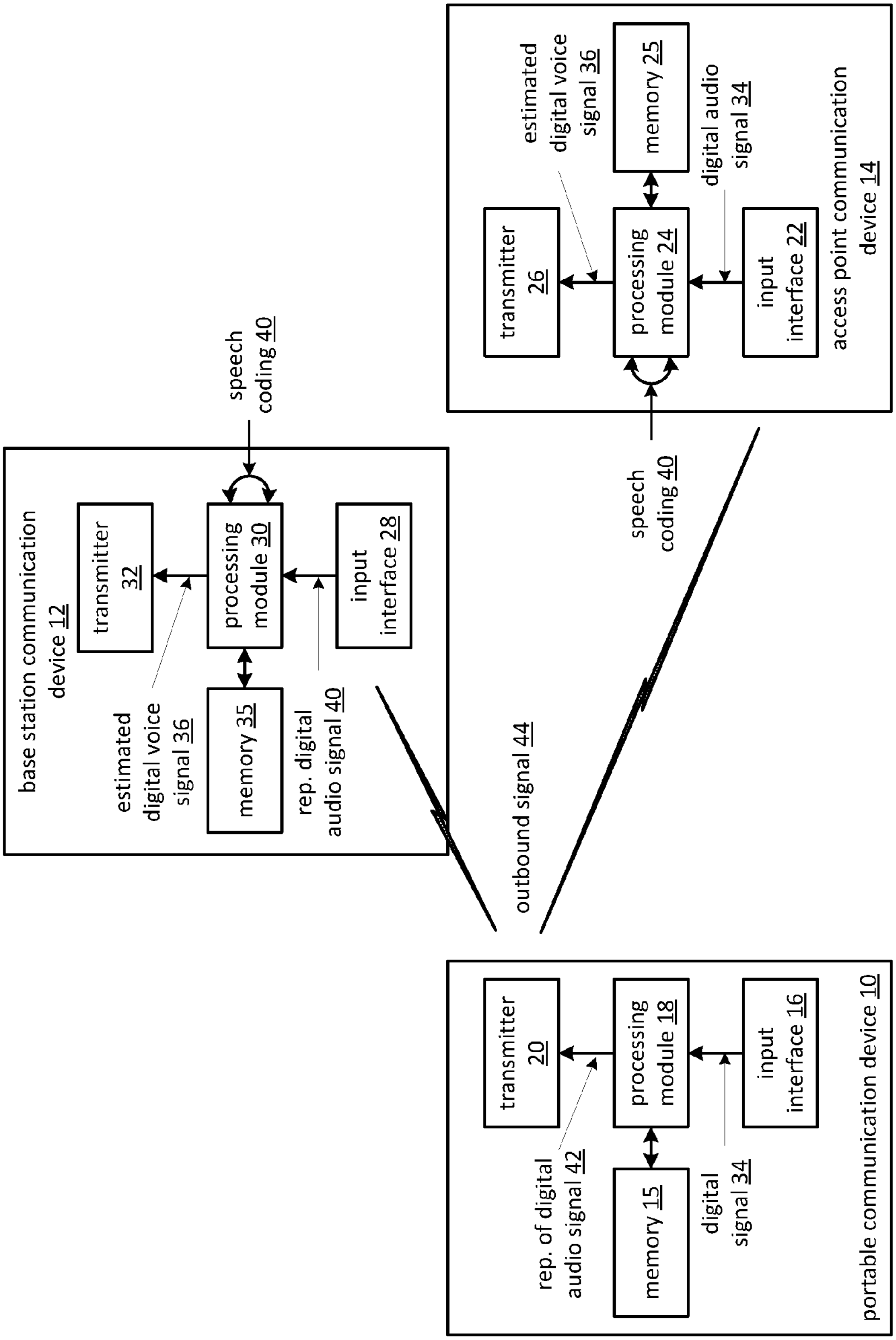
FIG. 2 is a schematic block diagram of another embodiment of a plurality of communication devices in accordance with the present invention.

FIG. 2 is a schematic block diagram of another embodiment of a plurality of communication devices 10-14. In this embodiment, the speech coding 40 of the digital audio signal 34 of the portable communication device 10 is performed by the processing module 30 of the base station communication device 12 or by the processing module 24 of the access point communication device 14.

In an example of operation, the interface module 16 generates the digital audio signal 34 as discussed with reference to FIG. 1 and provides it to the processing module 18. The processing module 18 converts the digital audio signal 34 into a representation of the digital audio signal 42. For example, the processing module 18 may convert the digital audio signal 34 into a symbol stream in accordance with one or more standards (e.g., IEEE 802.11.xx, GPRS, EDGE, GSM, WCDMA, high-speed downlink packet access (HSDPA), high-speed uplink packet access (HSUPA), etc.). As a specific example, the processing module 18 converts the digital audio signal 34 into a symbol stream in accordance with GSM, WCDMA, GPRS, EDGE, HSUPA, or other cellular data standard for transmission as a cellular data signal to the base station communication device 12. As another specific example, the processing module converts the digital audio signal 34 into a symbol stream in accordance with an IEEE 802.11.xx standard for subsequent transmission as a wireless local area network (WLAN) signal to the access point communication device 14.

The transmitter 20 converts the representation of the digital audio signal 42 into an outbound signal 44 in accordance with one or more of the plurality of communication standards. For example, the transmitter 20 may generate the outbound signal 44 in accordance with GSM, WCDMA, GPRS, EDGE, HSUPA, or other cellular data standards for transmission to the base station communication device 12. As another example, the transmitter may generate the outbound signal 44 in accordance with IEEE 802.11.xx or other WLAN standard for transmission to the access point communication device 14.

When the outbound signal 44 is a cellular data signal, the input interface 28 of the base station communication device 12 recovers the representation of the digital audio signal 40 from the outbound signal 44. The processing module 30 recovers the digital audio signal 34 from the representation signal 40 and performs the speech coding 40 on it to produce the estimated digital voice signal 36. The transmitter 32, which may be a backhaul network connection interface, converts the estimated digital voice signal 36 into an outbound signal in accordance with a cellular infrastructure protocol and transmits it.

When the outbound signal 44 is a WLAN signal, the input interface 22 of the access point communication device 14 recovers the representation of the digital audio signal 40 from the outbound signal 44. The processing module 24 recovers the digital audio signal 34 from the representation signal 40 and performs the speech coding 40 on it to produce the estimated digital voice signal 36. The transmitter 26, which may be a backhaul WLAN connection interface, converts the estimated digital voice signal 36 into an outbound signal in accordance with a WLAN infrastructure protocol and transmits it.

Figure 3:
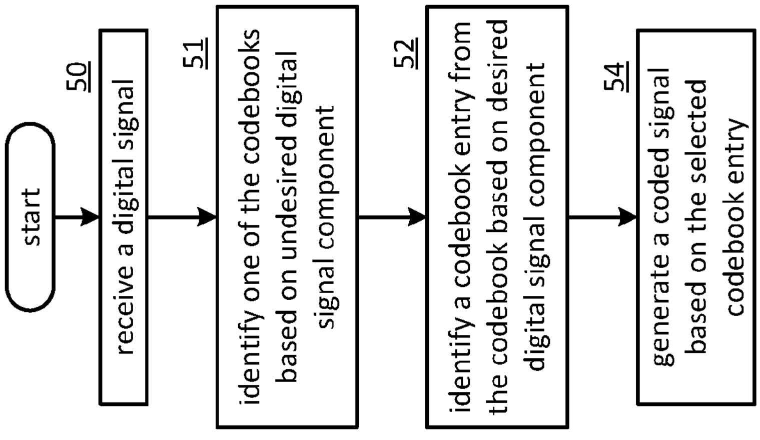
FIG. 3 is a logic diagram of an embodiment of a method for reduced noise audio coding in accordance with the present invention.

FIG. 3 is a logic diagram of an embodiment of a method for reduced noise audio coding that begins at step 50 where the processing module 18, 24, 30 receives a digital signal from the corresponding input interface 16, 22, 28. The digital signal includes a desired digital signal component (e.g., speech and/or an audio signal) and an undesired digital signal component (e.g., noise). The method continues at step 52 where the processing module identifies one of a plurality of codebooks based on the undesired digital signal component.

In an embodiment, the processing module identifies the codebook by detecting when the undesired digital signal component is a dominant signal component of the digital signal. When the undesired digital signal component is the dominant signal component, the processing module determines the magnitude of the undesired digital signal component. Such processing will be described in greater detail with reference to FIGS. 6 and 7. The processing module selects the codebook based on an inverse proportional relationship between resolution of a codebook and the magnitude of the undesired digital signal component. For example, when the undesired digital signal component (e.g., noise) is small (e.g., have a relatively high signal-to-noise ratio (SNR)), the processing module selects a high resolution codebook (e.g., 16 Kbit, 32 Kbit or higher bit codebook). As another example, when the undesired digital signal component is larger (e.g., have a smaller SNR), the processing module selects a lower resolution codebook (e.g., 8 Kbit, 4 Kbit, or lower bit codebook).

The method continues at step 52 where the processing module identifies a codebook entry from the identified codebook based on the desired digital signal component to produce a selected codebook entry. The method continues at step 54 where the processing module generates a coded signal based on the selected codebook entry, wherein the coded signal includes a substantially unattenuated representation of the desired digital signal component and an attenuated representation of the undesired digital signal component. In an embodiment, the processing module 18 may use a known speech coding scheme such as Code Excited Linear Prediction (CELP) as modified in accordance with the present invention to generate coded signals. Note that the identifying of the codebook and the entry thereof may be an iterative process (e.g., back and forth between codebooks to identify one or more entries that accurately represent the digital audio signal with an attenuated undesired signal component).

Figure 4:
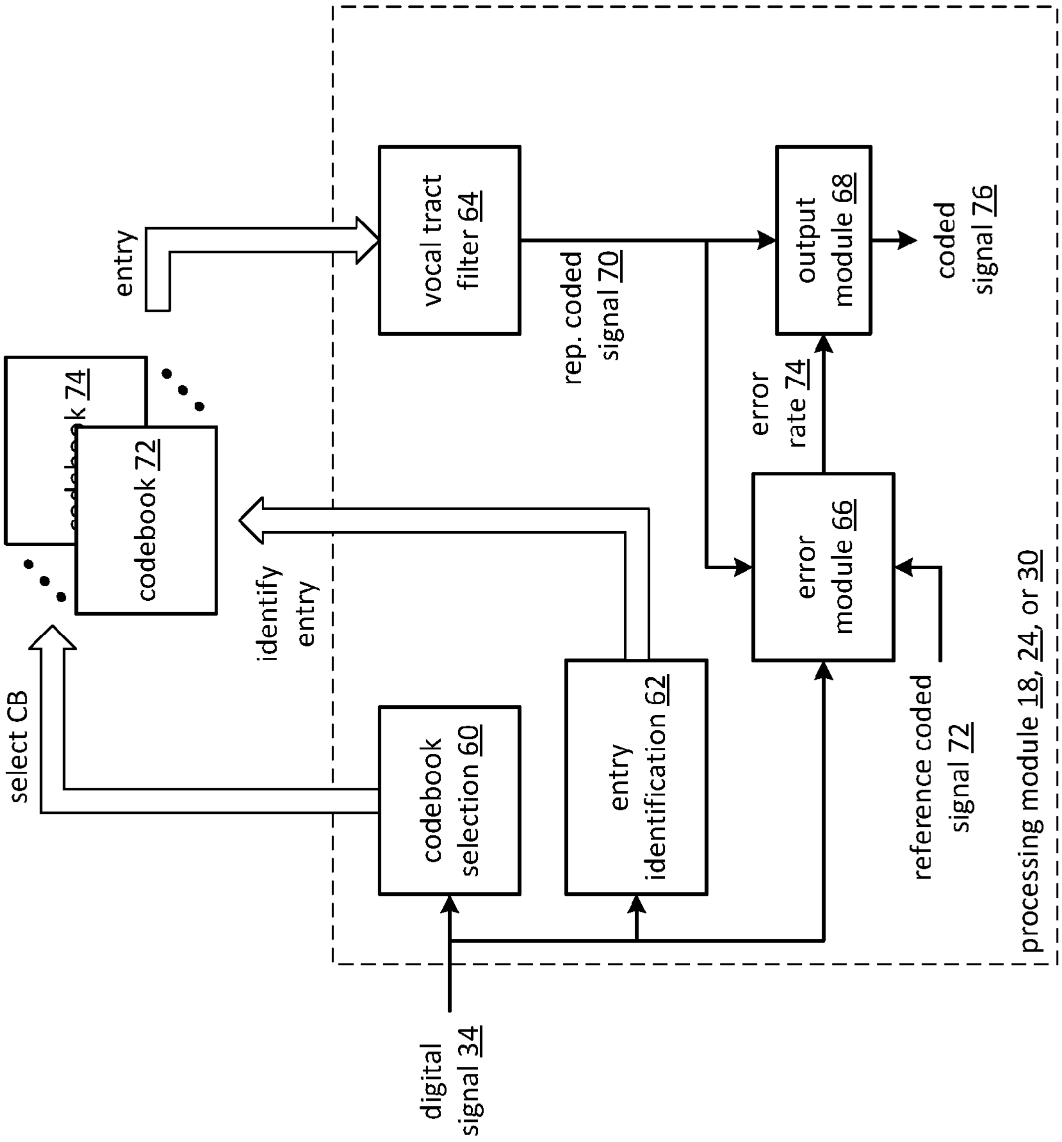
FIG. 4 is a schematic block diagram of an embodiment of a processing module in accordance with the present invention.

FIG. 4 is a schematic block diagram of an embodiment of a processing module 18, 24, 30 coupled to a plurality of codebooks 72-74. The processing module includes a codebook selection module 60, an entry identification module 62, a vocal tract filter module 64, an error module 66, and an output module 68. Each of the modules 60-68 may be a separate processing device within the processing module, a shared processing device within the processing module, or a combination thereof.

Each of the codebooks 72-74 generally includes a series of alternative pulse-like excitation code vector signals used to excite a vocal tract filter that is modeled after a vocal track to produce synthesized speech. As an example, a codebook may contain phonemes and/or a collection of allophones for each of the phonemes. The phonemes may be vowels, semivowels, diphthongs, and/or consonants, which includes nasal, stops (plosives), fricatives, and/or affricates. As another example, a codebook may include a plurality of quantified speech features such as estimated linear prediction filter coefficients, estimated system gains, sound or unsound indications, etc. As yet another example, a codebook may contain centroids for vector quantization. For instance, centroids of a cluster represent the sounds associated with the cluster, where a cluster is a set of naturally occurring observation vectors. The codebooks 72-74 differ from one another in the resolution of the code entries therein. For instance, one codebook may include 16 Kbit resolution, another may include 8 Kbit resolution, another may include 4 Kbit resolution, and other codebooks may include different resolutions.

In an example of operation, the codebook selection module 60 and the entry identification module 62 receive a digital signal 34 from the input interface. The digital signal 34 includes a desired digital signal component (e.g., audio and/or speech) and an undesired digital signal component (e.g., noise). The codebook selection module 60 utilizes the undesired signal component to identify one of the codebooks 72-74 to produce a selected codebook (CB). For example, the codebook selection module 60 may determine a signal to noise ratio based on the desired and undesired signal components to identify the desired codebook, may use a look up table based on the magnitude of the undesired signal component, or use a default codebook and then adjust based on a codebook index generated based on error rates 74 of entries from one or more of the codebooks 72-74.

The entry identification module 62 identifies a codebook entry from the selected codebook(s) based on the desired digital signal component to produce a selected codebook entry. For instance, the codebook entry may be identified by first loading the vocal tract filter module 64 with an entry of the selected codebook(s). The vocal tract filter module then filters the entry to produce a representative coded signal. The error module 66 then determines an error rate 74 of the representative coded signal based on a referenced coded signal 72 and determines whether it is a favorable error rate (e.g., produces an accurate representation of the digital signal 34 with a desired noise level). When the error rate is favorable, the entry identification module 62 identifies the entry as the selected codebook entry and the output module 68 outputs the corresponding representative coded signal 70 as the coded signal 76.

When the error rate is unfavorable, the entry identification module 62 identifies another entry and causes it to be loading into the vocal tract filter module 64, which filters the other entry to produce a second representative coded signal 70. The error module 66 determines a second error rate 74 of the second representative coded signal 70. When the second error rate is favorable, the entry identification module 62 identifies the other entry as the selected codebook entry. When the second error is not favorable, then the process repeats for other entries until one is found that provides a favorable error rate.

Figure 5:
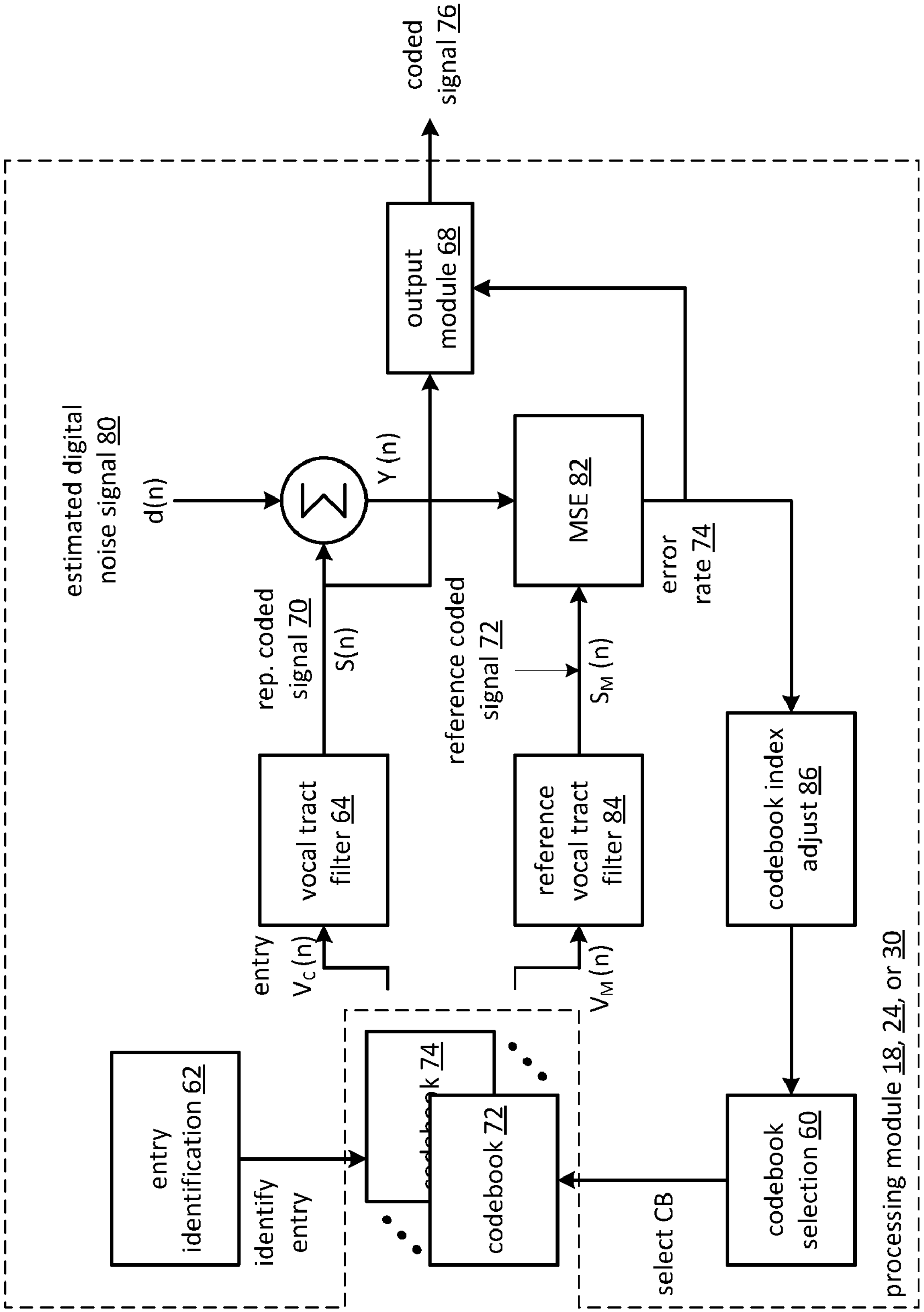
FIG. 5 is a schematic block diagram of another embodiment of a processing module in accordance with the present invention.

FIG. 5 is a schematic block diagram of another embodiment of a processing module 18, 24, 30 coupled to a plurality of codebooks 72-74. The processing module includes the codebook selection module 60, the entry selection module 62, the vocal tract filter module 64, a summing module, the output module 68, a mean square error (MSE) module 82, a reference vocal tract filter module 84, and a codebook index adjust module 86.

In an example of operation, the codebook selection module 60 initially selects a high resolution codebook (e.g., CB(1), where the "1" indicates the codebook index "i" where "i" ranges from 1 to n). For this codebook (CB(1)), the entry identification module 62 selects an entry (e.g., $V_C(n)$) and a reference entry (e.g., $V_M(n)$). The vocal tract filter module 64 filters the entry $V_C(n)$ to produce a representative coded signal 70 (e.g., S(n)), which represents a "clean" signal (e.g., the desired signal component ($S_{D1}(n)$) with the undesired signal component attenuated d'(n)). The representative coded signal 70 is added with the estimated noise component 80 (e.g., d(n)) to produce a representative signal (e.g., Y(n)).

The reference vocal tract filter module 84 filters the reference entry ($V_M(n)$) to produce a reference coded signal ($S_M(n)$), which represents the desired signal component ($S_{D2}(n)$) and the undesired signal component D(n). The MSE module 82, which is part of the error module 66, performs a mean square error function:

$$m^* = \underset{m}{\arg\min}\, \varepsilon_m$$

$$\varepsilon_m = \|s_m(n) - y(n)\|^2$$

to produce an error rate 74. For example, $y(n)=S_{D1}(n)+d'(n)+d(n)$ and $s_m(n)=S_{D2}(n)+D(n)$. From these equations, when $S_{D1}(n)$ is approximately equal to $S_{D2}(n)$, the attenuated undesired signal component d'(n) is small in comparison to the injected noise d(n), and the injected noise d(n) is approximately equal to the undesired noise component D(n) of the reference coded signal 72, the error rate 74 will be low. When the error rate 74 is at a desired level (e.g., below a threshold, the lowest determined for a number of codebooks and/or entries of a codebook, etc.), the output module 68 outputs the representative coded signal 70 as the coded signal 76.

When the error rate 74 is not at the desired level, the entry identification module 62 selects another reference entry $V_M(n)$ and keeps the selection of the entry $V_C(n)$. The above described process repeats for this combination of entries. If the error rate is again at the desired level, the entry identification module 62 selects another reference entry $V_M(n)$ and keeps the selection of the entry $V_C(n)$. This process repeats until the entry identification module 62 exhausts a determined set of entries of the selected codebook (e.g., all of the entries, entries proximal to an approximation of the coded signal, etc.).

When the determined set of entries of the selected codebook have been exhausted, the entry identification module 62 selects another entry from the selected codebook for the vocal tract filter 64 and the above process repeats until a determined set of entries of the selected codebook has been exhausted or the error rate is at the desired level.

When the determined set of entries of the selected codebook has been exhausted for the entry $V_C(n)$, the codebook index adjusts module 86 increments the codebook index (i=i+1) such that the codebook selection module 60 selects another codebook CB(i+1). In another embodiment, the larger the codebook index, the lower the resolution of the codebook entries. The above process repeats with the entry identification module 62 selecting an entry $V_C(n)$ from codebook CB(i+1) and the reference entry $V_M(n)$ from the first codebook CB(1) until the error rate is at the desired level or a determined set of entries of the codebook CB(i+1) is exhausted. If the codebook CB(i+1) is exhausted, the codebook index adjust module increments the codebook index and the codebook selection module selects another codebook (e.g., CB(i+2)).

Figure 6:
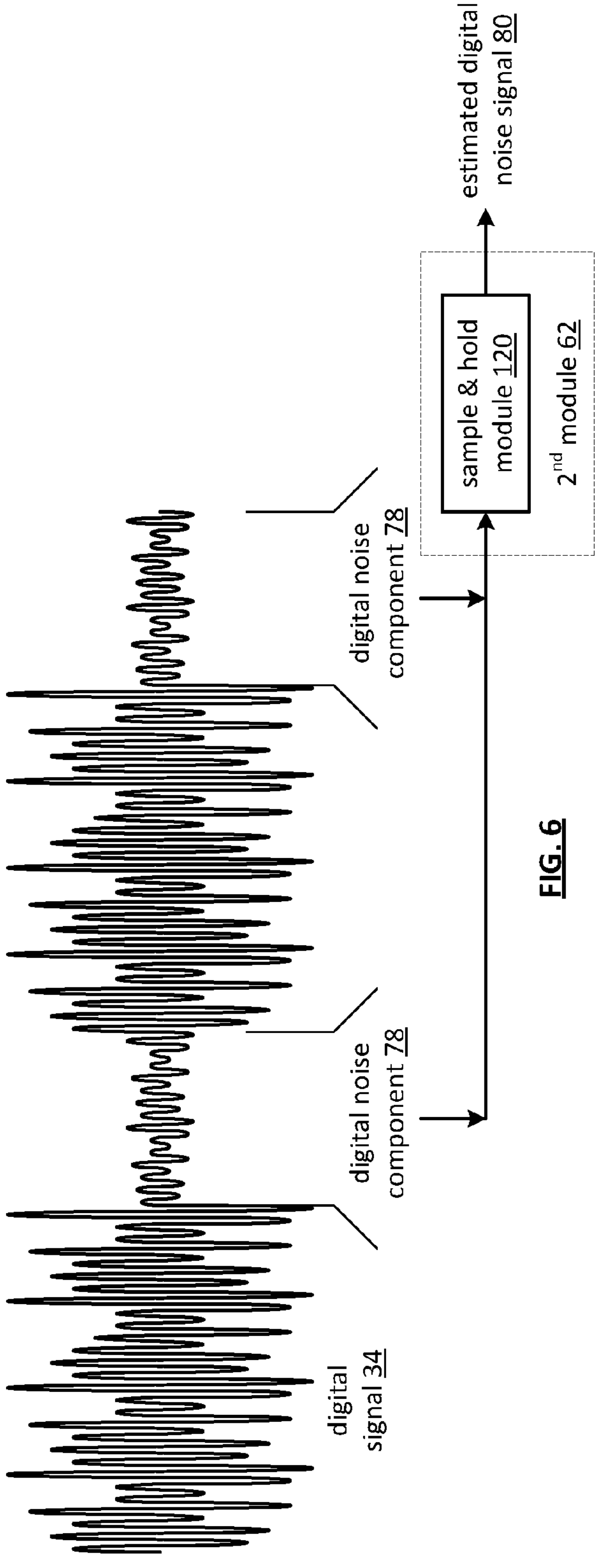
FIG. 6 is a schematic block diagram of an embodiment of a digital noise estimation module in accordance with the present invention.

FIG. 6 is a schematic block diagram of an embodiment of a digital noise estimation module 62 that includes a sample and hold module 120. In this embodiment, the sample and hold module 120 receives the digital audio signal 34 as an input, samples it, and determines if the current sample include a voice component and a noise component. When the digital audio signal 34 primarily includes the digital noise component 78 (e.g., little or no voice component), the sample and hold module 120 samples and holds the digital noise component 78 to produce the estimated digital noise signal 80.

Figure 7:
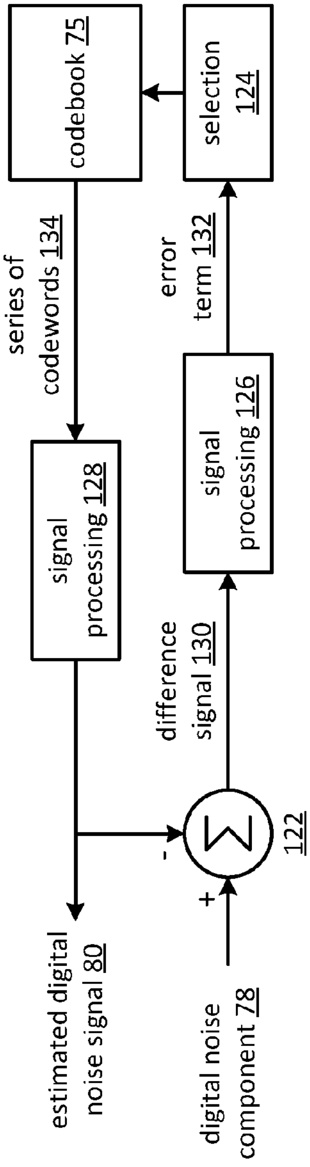
FIG. 7 is a schematic block diagram of another embodiment of a digital noise estimation module in accordance with the present invention.

FIG. 7 is a schematic block diagram of another embodiment of a digital noise estimation module 62 that includes a subtraction module 122, a signal processing module 126, a selection module 124, and another signal processing module 128. On a frame-by-frame basis when the digital noise component 78 is dominate (e.g., little or no voice component) one or more noise codebooks is accessed a number of times to retrieve a series of codewords 134. For each of the codewords in the series 134, the signal processing module 128 performs a pre-filtering function (e.g., pitch filtering) and/or a transfer function (e.g., 1/A(z) for data compression) to produce a plurality of estimations for a frame of the estimated digital noise signal 80.

The subtraction module 122 sequentially subtracts the plurality of estimations of the frame of the estimated digital noise signal 80 from a corresponding frame of the digital noise component 78 to produce a plurality of difference signals 130. The signal processing module 126 sequentially performs a post filtering function (e.g., perceptual filtering) and/or a mean square error calculation on the plurality of difference signals 130 to produce a plurality of error terms 132. The selection module 124 utilizes the plurality of error terms 132 to address the codebook(s) to retrieve the series of codewords 134.

When the digital noise component 78 is not dominant (e.g., a voice component exists) for one or more frames, the digital noise estimation module 62 does not process such frames. It outputs one or more frames of the estimated digital signal 80 it determined from previous frames where the digital noise component 78 was dominate.

Figure 8:
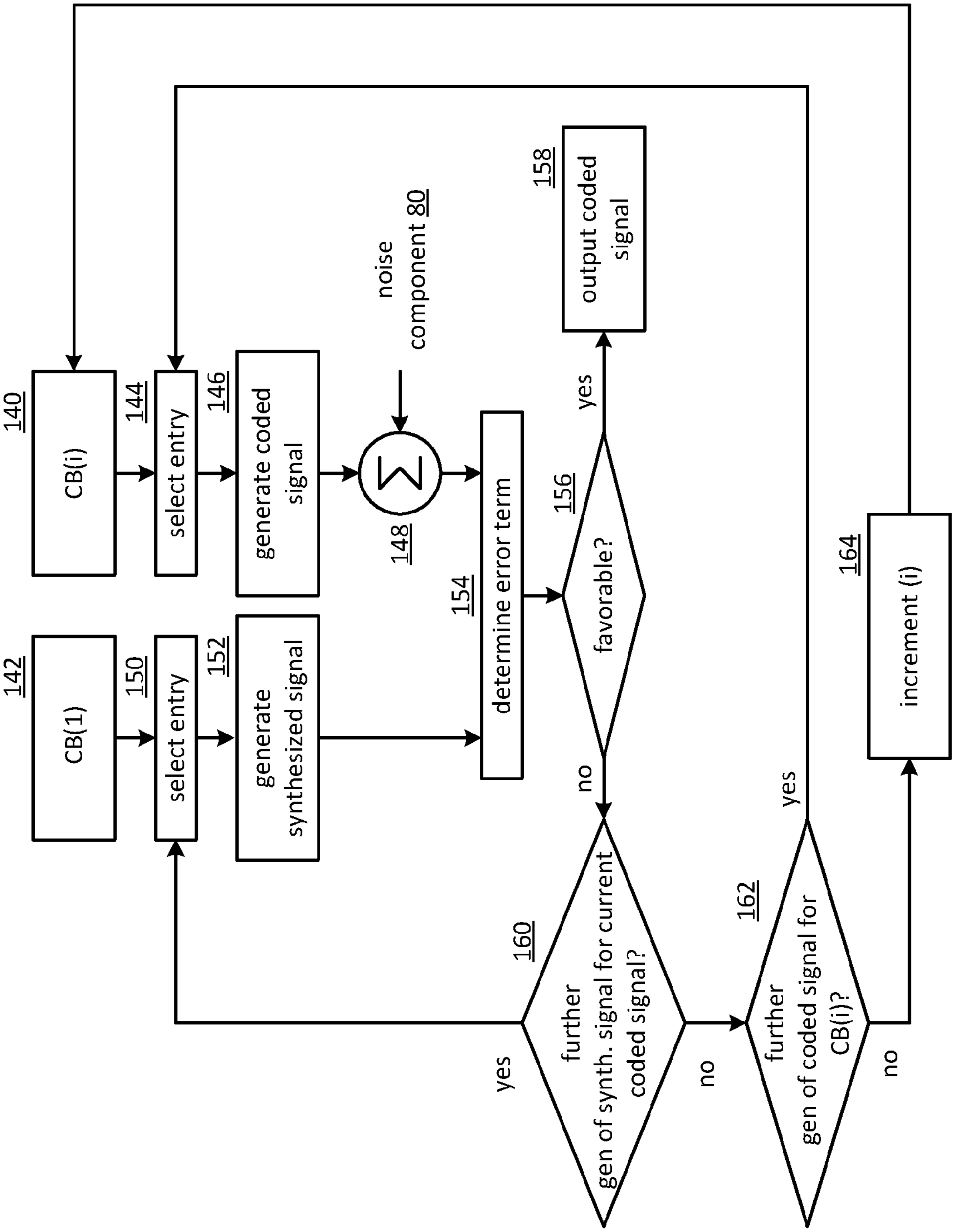
FIG. 8 is a logic diagram of another embodiment of a method for reduced noise audio coding in accordance with the present invention.

FIG. 8 is a logic diagram of another embodiment of a method for reduced noise audio coding that begins at steps 140 and 142. At step 140, a codebook having a codebook index (i) is selected. At the beginning of the method, the codebook index is equal to 1. At step 142, where the codebook CB(1) is selected for the reference loop. Note that the codebook index corresponds to the resolution of a codebook, where 1 represents the highest resolution codebook and higher numbers represent lower resolution codebooks.

The method continues from step 140 to step 144 where the processing module selects an entry from the codebook CB(i). The method continues at step 146 where the processing module generates a representative coded signal from the selected entry (e.g., filters the entry via a vocal tract filter). The method continues at step 148 where the coded signal is added to a noise component 80 to produce a representative signal (e.g., Y(n)).

The method continues from step 142 to step 150 where the processing module selects an entry from the first codebook CB(1). The method continues at step 152 where the processing module generates a synthesized signal based on the selected entry. The method continues at step 154 where the processing module determines an error term based on the synthesized signal and the representative signal. For instance, the synthesized signal is a reconstruction of the received digital signal including its noise component. The representative coded signal is a reconstruction of the received signal with an attenuated noise component. If the noise component is small (e.g., have a good signal to noise ratio), then the error term will be low when the representative coded signal accurately represents the received digital signal. If the noise component is not small (e.g., have a low signal to noise ratio) and the representative coded signal has sufficiently attenuated the noise component, the error term will be at a desired level. If not, the error term will not be at the desired level.

The method branches at step 156 depending on the whether the error term is favorable (e.g., is at the desired level). If yes, the method continues at step 158 where the processing module outputs the representative coded signal as the coded signal. If the error term is not favorable, the method continues at step 160 where the processing module determines whether to generate additional synthesized signals from the current coded signal. Such a determination is based on whether a determine set of entries of the first codebook CB(1) have been used for the current coded signal, i.e., the current entry from the current codebook. If yes, the method repeats at step 150 where the processing module selects another entry from the codebook CB(1).

If the determined set of entries of the first codebook CB(1) have been used for the current coded signal, the method continues at step 162 where the processing module determines whether to generate further coded signals from the current codebook CB(i). Such a determination is based on whether a determine set of entries of the current codebook CB(i) have been used for to generate a determined set of current coded signals. If yes, the method repeats at step 144 where the processing module selects another entry from the current codebook CB(i).

If the determined set of current coded signals has been generated from the current codebook CB(i), the method continues at step 164 where the processing module increments the codebook index (i) and the process repeats at step 140 for the new current codebook. This process repeats until a favorable error term is obtained.

Figure 9:
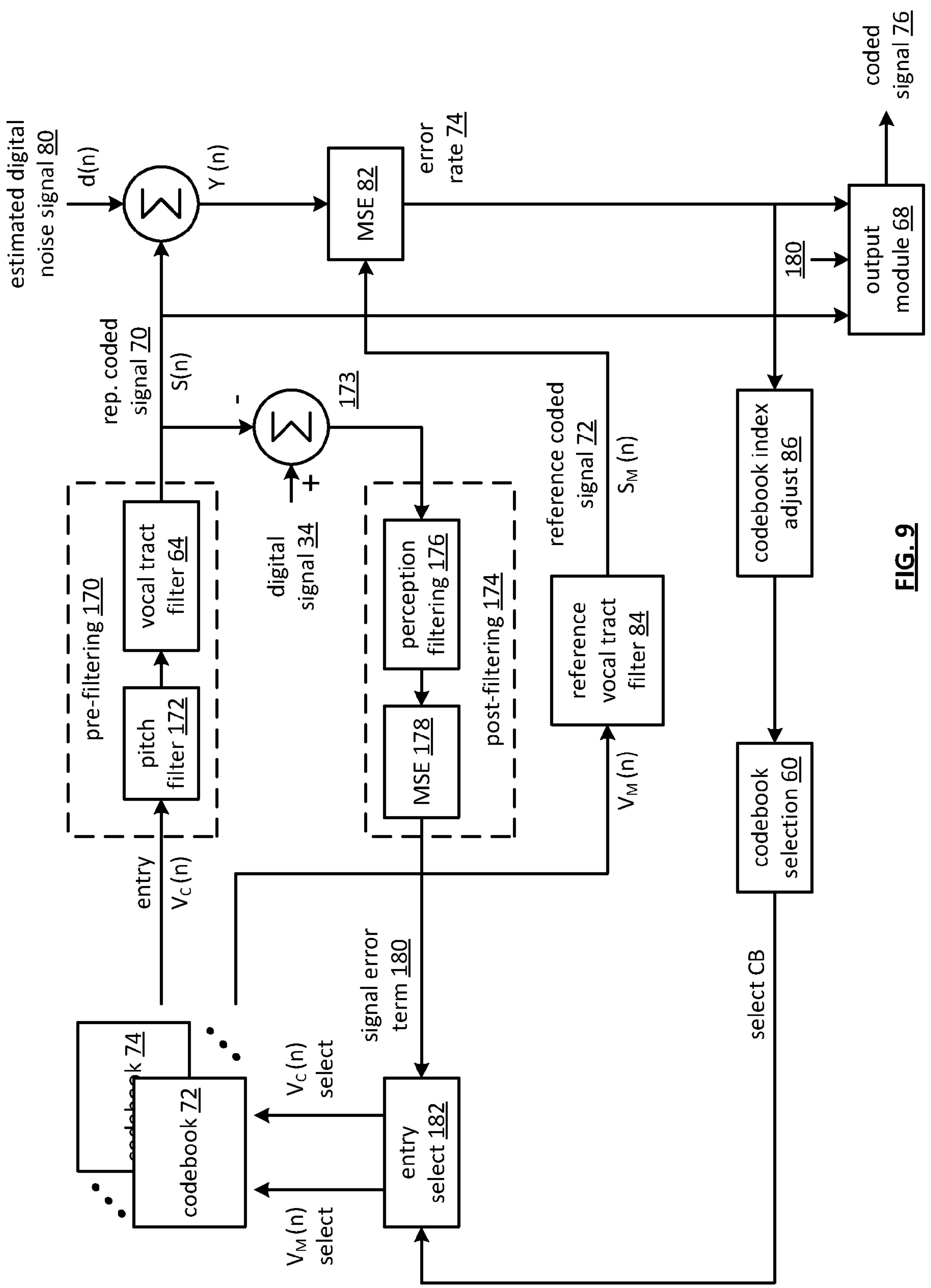
FIG. 9 is a schematic block diagram of another embodiment of a processing module in accordance with the present invention.

FIG. 9 is a schematic block diagram of another embodiment of a processing module 18, 24, 30 coupled to a plurality of codebooks 72-74. The processing module includes the codebook selection module 60, the entry selection module 62, a pre-filtering stage 170, a subtraction module 173, a post-filtering stage 174, a summing module, the output module 68, a mean square error (MSE) module 82, a reference vocal tract filter module 84, and a codebook index adjust module 86. The pre-filtering stage 170 includes a pitch filter 170 and the vocal tract filter module 64. The post-filtering stage 174 includes a perception filtering module 176 and a second MSE module 178. Note that MSE module 178 and MSE module 82 may be the same modules or different.

In an example of operation, the codebook selection module 60 initially selects a high resolution codebook (e.g., CB(1), where the "1" indicates the codebook index "i" where "i" ranges from 1 to n). For this codebook (CB(1)), the entry identification module 62 selects an entry (e.g., $V_C(n)$) and a reference entry (e.g., $V_M(n)$) in accordance with a signal error term 180, which represents the accuracy of encoding the digital signal 34.

The pitch filter 172 and the vocal tract filter module 64 filter the entry $V_C(n)$ to produce a representative coded signal 70 (e.g., S(n)), which represents a "clean" signal (e.g., the desired signal component ($S_{D1}(n)$) with the undesired signal component attenuated d'(n)). The subtraction module 173 subtracts the representative coded signal 70 from the digital signal 34 to produce a difference signal. The perception filtering module 176 filters the difference signal, which is subsequently processed by the MSE module 178 to produce the signal error term 180. If the representative coded signal 70 accurately represents the digital signal 34, the error term 180 will be low. The representative coded signal 70 is also added to the estimated noise component 80 (e.g., d(n)) to produce a representative signal (e.g., Y(n)).

The reference vocal tract filter module 84 filters the reference entry ($V_M(n)$) to produce a reference coded signal ($S_M(n)$), which represents the desired signal component ($S_{D2}(n)$) and the undesired signal component D(n). The MSE module 82, which is part of the error module 66, performs a mean square error function:

$$m^* = \underset{m}{\operatorname{argmin}}\, \varepsilon_m$$

$$\varepsilon_m = \|s_m(n) - y(n)\|^2$$

to produce an error rate 74. For example, $y(n)=S_{D1}(n)+d'(n)+d(n)$ and $s_m(n)=S_{D2}(n)+D(n)$. From these equations, when $S_{D1}(n)$ is approximately equal to $S_{D2}(n)$, the attenuated undesired signal component d'(n) is small in comparison to the injected noise d(n), and the injected noise d(n) is approximately equal to the undesired noise component D(n) of the reference coded signal 72, the error rate 74 will be low. When the error rate 74 is at a desired level (e.g., below a threshold, the lowest determined for a number of codebooks and/or entries of a codebook, etc.) and the signal error term 180 is low, the output module 68 outputs the representative coded signal 70 as the coded signal 76.

When the error rate 74 is not at the desired level, the entry identification module 62 selects another reference entry $V_M(n)$ and keeps the selection of the entry $V_C(n)$. The above described process repeats for this combination of entries. If the error rate is again at the desired level, the entry identification module 62 selects another reference entry $V_M(n)$ and keeps the selection of the entry $V_C(n)$. This process repeats until the entry identification module 62 exhausts a determined set of entries of the selected codebook (e.g., all of the entries, entries proximal to an approximation of the coded signal, etc.).

When the determined set of entries of the selected codebook have been exhausted, the entry identification module 62 selects another entry from the selected codebook for the vocal tract filter 64 and the above process repeats until a determined set of entries of the selected codebook has been exhausted or the error rate is at the desired level.

When the determined set of entries of the selected codebook has been exhausted for the entry $V_C(n)$, the codebook index adjust module 86 increments the codebook index (i=i+1) such that the codebook selection module 60 selects another codebook CB(i+1). In another embodiment, the larger the codebook index, the lower the resolution of the codebook entries. The above process repeats with the entry identification module 62 selecting an entry $V_C(n)$ from codebook CB(i+1) and the reference entry $V_M(n)$ from the first codebook CB(1) until the error rate is at the desired level or a determined set of entries of the codebook CB(i+1) is exhausted. If the codebook CB(i+1) is exhausted, the codebook index adjust module increments the codebook index and the codebook selection module selects another codebook (e.g., CB(i+2)).

Figure 10:
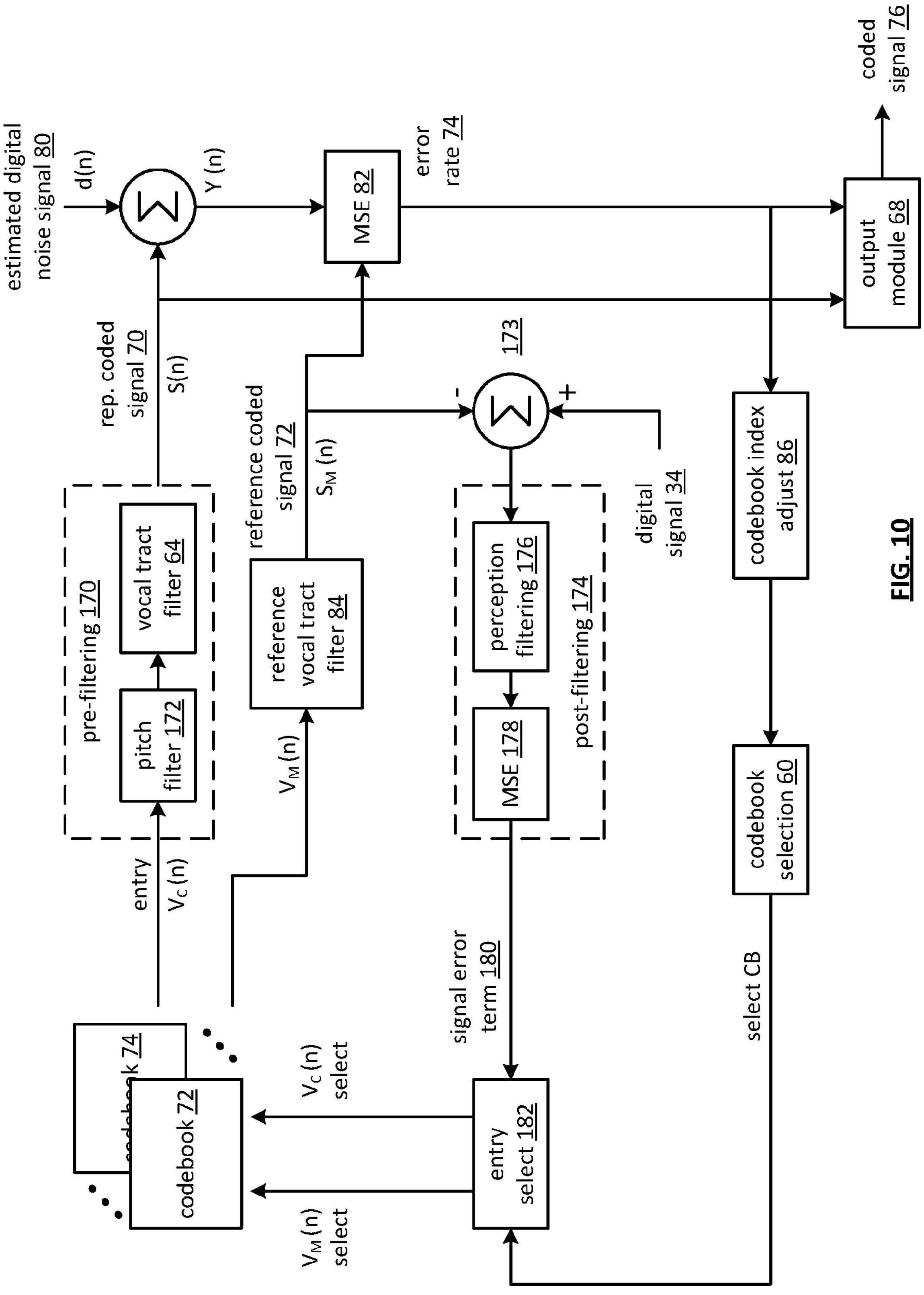
FIG. 10 is a schematic block diagram of another embodiment of a processing module in accordance with the present invention.

FIG. 10 is a schematic block diagram of another embodiment of a processing module 18, 24, 30 coupled to a plurality of codebooks 72-74. The processing module includes the codebook selection module 60, the entry selection module 62, a pre-filtering stage 170, a subtraction module 173, a post-filtering stage 174, a summing module, the output module 68, a mean square error (MSE) module 82, a reference vocal tract filter module 84, and a codebook index adjust module 86. The pre-filtering stage 170 includes a pitch filter 170 and the vocal tract filter module 64. The post-filtering stage 174 includes a perception filtering module 176 and a second MSE module 178. Note that MSE module 178 and MSE module 82 may be the same modules or different.

In an example of operation, the codebook selection module 60 initially selects a high resolution codebook (e.g., CB(1), where the "1" indicates the codebook index "i" where "i" ranges from 1 to n). For this codebook (CB(1)), the entry identification module 62 selects an entry (e.g., $V_C(n)$) and a reference entry (e.g., $V_M(n)$) in accordance with a signal error term 180, which represents the accuracy of encoding the digital signal 34.

The reference vocal tract filter module 84 filters the reference entry ($V_M(n)$) to produce a reference coded signal ($S_M(n)$), which represents the desired signal component ($S_{D2}(n)$) and the undesired signal component D(n). The subtraction module 173 subtracts the reference coded signal 72 from the digital signal 34 to produce a difference signal. The perception filtering module 176 filters the difference signal, which is subsequently processed by the MSE module 178 to produce the signal error term 180. If the reference coded signal 72 accurately represents the digital signal 34, the error term 180 will be low.

The pitch filter 172 and the vocal tract filter module 64 filter the entry $V_C(n)$ to produce a representative coded signal 70 (e.g., S(n)), which represents a "clean" signal (e.g., the desired signal component ($S_{D1}(n)$) with the undesired signal component attenuated d'(n)). The representative coded signal 70 is also added to the estimated noise component 80 (e.g., d(n)) to produce a representative signal (e.g., Y(n)). The remaining portions function as previously described in FIG. 9.

Figure 11:
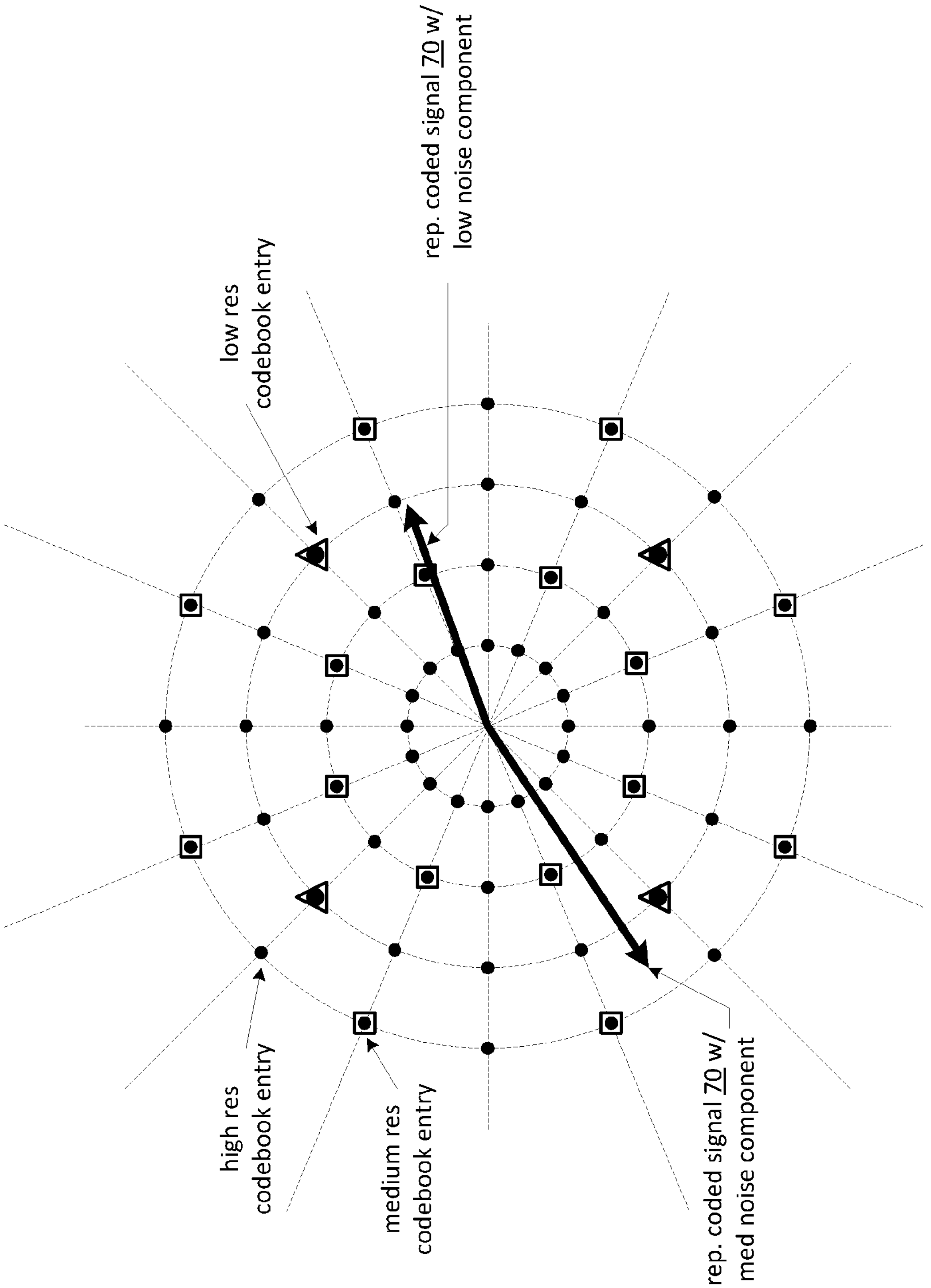
FIG. 11 is a diagram of an example of reduced noise audio coding in accordance with the present invention.

FIG. 11 is a diagram of an example of three codebooks of varying resolution. The first codebook having the highest resolution includes 64 entries, which are represented by the dots. A second codebook includes 16 entries, which are represented by the squares and the third codebook includes 4 entries, which are represented by triangles. As shown, a higher resolution codebook entry may be the same as a lower resolution codebook entry (e.g., a dot within a square, a dot within a triangle). Note that a typical codebook would include significantly more entries than shown, but is shown with a small number of entries for ease of illustration.

In this example, two representative coded signals are shown as vectors. A first one has a low noise component and, as such, can be approximated by an entry in the high resolution codebook. While not shown, the coded signal would have an associated error term with respect to each entry of the high resolution codebook. The error term would be smallest for the entry that the coded signal vector is closest to and this error term would be considerably smaller than the error terms for other proximal entries.

Figure 12:
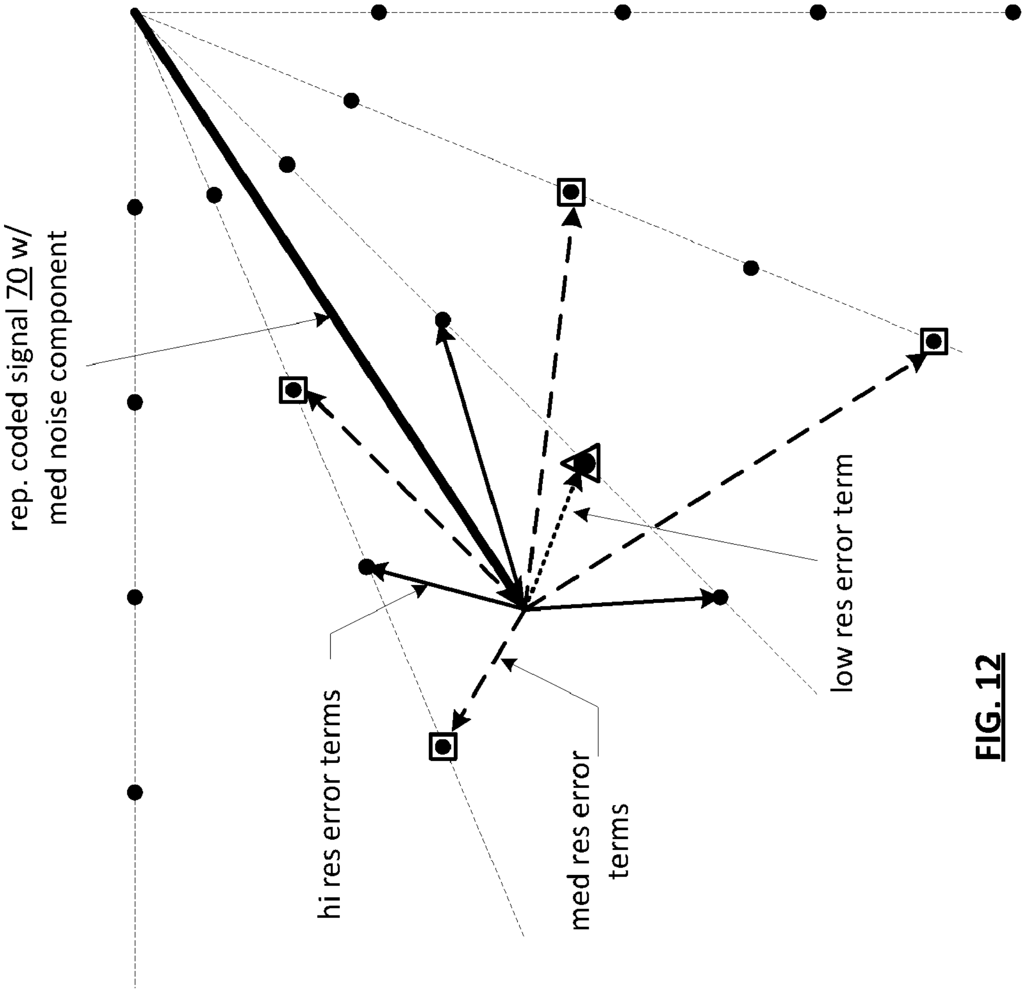
FIG. 12 is a diagram of another example of reduced noise audio coding in accordance with the present invention.

The second coded signal includes a medium noise component and has error terms for each entry of the high resolution codebook. In this example, the error terms of the proximal entries of the high resolution codebook are about equal, indicating that there is not one clear high resolution entry. In this situation, the medium resolution codebook would be used and error terms generated for each entry. FIG. 12 illustrates this in greater detail.

FIG. 12 is a diagram of another example of the second representative coded signal of FIG. 11. In this example, high resolution error terms are shown with respect to proximal high resolution entries (i.e., the dots), medium resolution error terms are shown with respect to proximal medium resolution entries (i.e., the squares), and low resolution error terms are shown with respect to proximal low resolution entries (i.e., the triangle).

With respect to the proximal high resolution entries, the corresponding error terms are approximately equal, indicating that a lower resolution codebook should be used. With respect to the proximal medium resolution entries, one of the corresponding error terms is clearly smaller than the others. As such, the entry can be used to approximate the digital signal. If this were not the case, the low resolution entry would be used.

As inferred from FIGS. 11 and 12, not all of the entries of a codebook need to be processed as previously described. For instance, if the entries are stored in an organized manner that resembles the entry constellation of FIGS. 11 and 12, then a sequence can be used to determine a quadrant and proximal entries within the quadrant.

Figure 13:
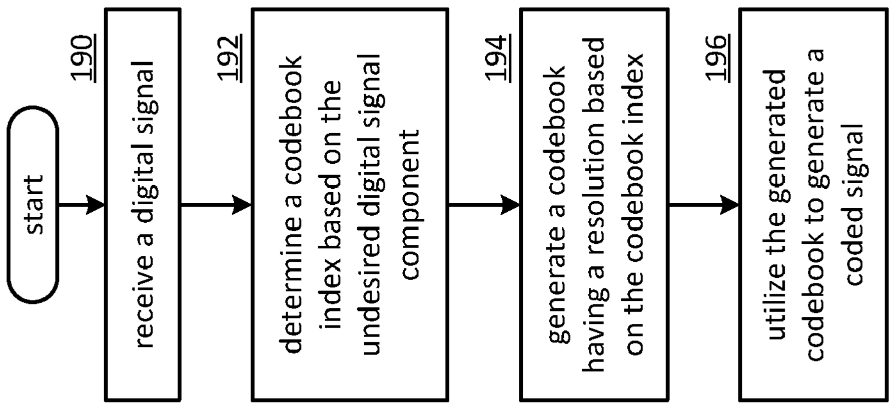
FIG. 13 is a logic diagram of another embodiment of a method for reduced noise audio coding in accordance with the present invention.

FIG. 13 is a logic diagram of another embodiment of a method for reduced noise audio coding that begins at step 190 where the processing module receives a digital signal from the input interface. In this instance, the digital signal includes a desired digital signal component (e.g., voice and/or audio) and an undesired digital signal component (e.g., noise). The method continues at step 192 where the processing module determines a codebook index based on the undesired digital signal component. For example, if the undesired digital signal component is small with respect to the desired signal component (e.g., has a good signal to noise ratio), then a high resolution codebook can be used, i.e., have a codebook index of 1. If, on the other hand, the signal to noise ratio is low, then a low resolution codebook can be used, which has a greater than 1 index.

In an embodiment, the processing module may determine the codebook index by detecting when the undesired digital signal component is a dominant signal component of the digital signal. The processing module then, when the undesired digital signal component is the dominant signal component, determines magnitude of the undesired digital signal component. The processing module then determines the codebook index based on an inverse proportional relationship between resolution of the generated codebook and the magnitude of the undesired digital signal component.

The method continues at step 194 where the processing module generates a codebook having a resolution based on the codebook index to produce a generated codebook. For example, the processing module may generate a high resolution codebook when the codebook index corresponds to the undesired signal component being below a first threshold. As another example, the processing module may generate a low resolution codebook when the codebook index corresponds to the undesired signal component being above a second threshold, wherein the second threshold is equal to or greater than the first threshold.

The method continues at step 196 where the processing module utilizes, as previously described, the generated codebook to generate a coded signal, which includes a substantially unattenuated representation of the desired digital signal component and an attenuated representation of the undesired digital signal component.

Figure 14:
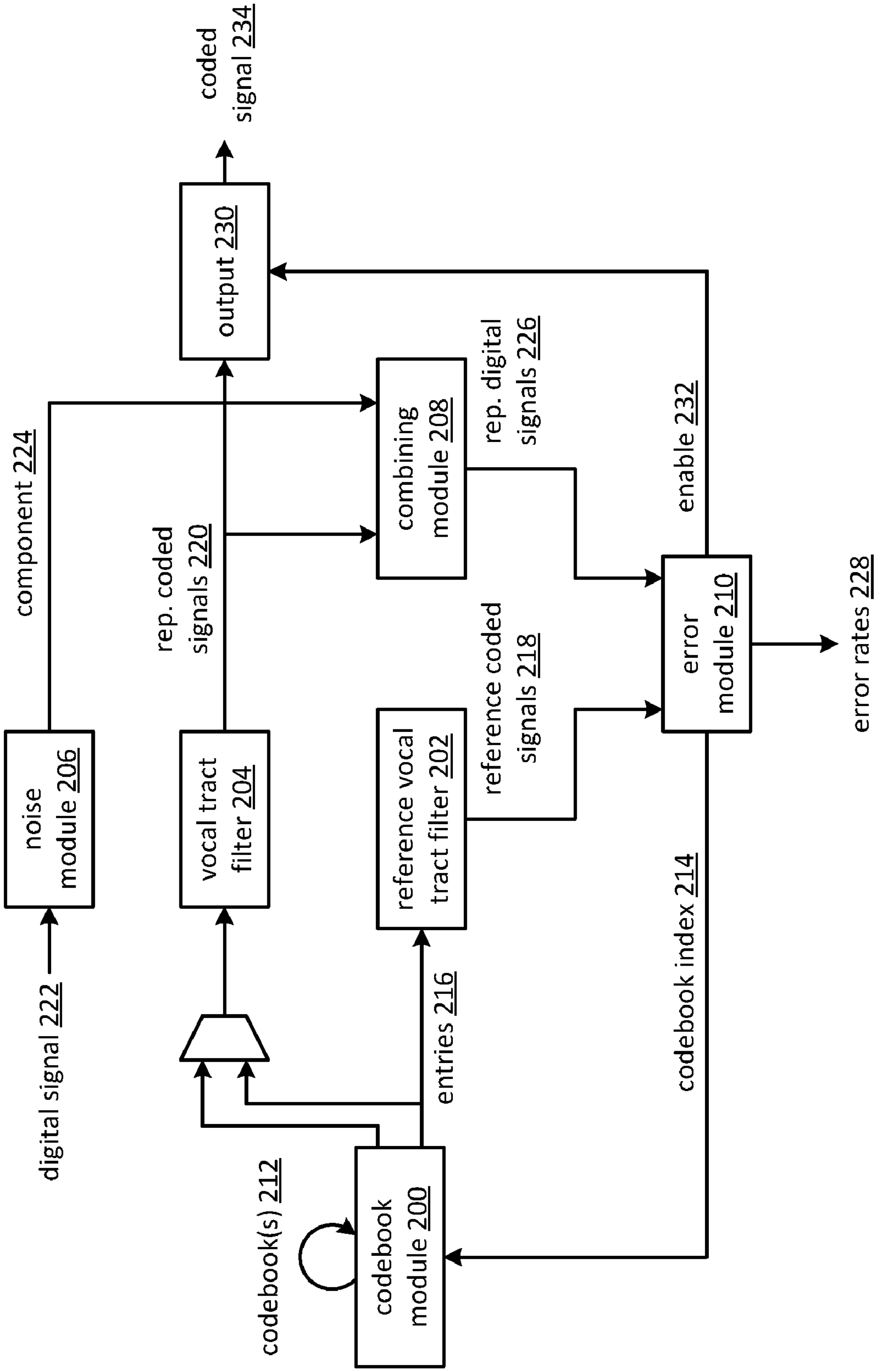
FIG. 14 is a schematic block diagram of another embodiment of a processing module in accordance with the present invention.

FIG. 14 is a schematic block diagram of another embodiment of a processing module that includes a codebook module 200, a reference vocal tract filter module 202, a vocal tract filter module 204, a noise module 206, a combining module 208, an error module 210, and an output module 230. The codebook module 200 is operable to generate one or more codebooks 212 based on a codebook index 214. For example, the codebook module 200 generates a high resolution codebook when the codebook index is of a first value that indicates a low level of the noise component and generates a low resolution codebook when the codebook index is of a second value that indicates a high level of the noise component.

The reference vocal tract filter 202 is operable to filter entries of a first codebook (e.g., a high resolution codebook) to produce a plurality of reference coded signals 218. The vocal tract filter 204 is operable to filter the entries of the first codebook or entries of another codebook (e.g., a lower resolution codebook) to produce a plurality of representative coded signals 220. The noise module 206 is operable to determine a noise component 224 of a digital signal 222 that includes an audio component and the noise component. The combining module 208 is operable to combine the noise component with the plurality of representative coded signals to produce a plurality of representative digital signals 226.

The error module 210 is operable to determine a plurality of error rates 228 based on the plurality of representative digital signals 226 and the plurality of referenced coded signals 218. In addition, the error module 210 generates the codebook index 214 based on at least one of the plurality of error rates and enables 232 outputting of one of the plurality of representative coded signals as a coded signal 234 when a corresponding error rate of the plurality of error rates is favorable.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A communication device comprises:

an input interface;

a processing module operably coupled to:

receive a digital signal from the input interface, wherein the digital signal includes a desired digital signal component and an undesired digital signal component;

identify one of a plurality of codebooks based on the undesired digital signal component;

identify a code book entry from the one of the plurality of code books based on the desired digital signal component to produce a selected codebook entry; and generate a coded signal based on the selected codebook entry, wherein the coded signal includes a substantially unattenuated representation of the desired digital signal component and an attenuated representation of the undesired digital signal component; and a transmitter operably coupled to:

convert the coded signal into an outbound signal in accordance with a signaling protocol; and transmit the outbound signal.

2. The communication device of claim 1, wherein the processing module identifies the one of the plurality of code books by:

detecting when the undesired digital signal component is a dominant signal component of the digital signal;

when the undesired digital signal component is the dominant signal component, determining magnitude of the undesired digital signal component; and selecting the one of the plurality of codebooks based on an inverse proportional relationship between resolution of a codebook and the magnitude of the undesired digital signal component, wherein the plurality of codebooks includes at least one higher resolution codebook and at least one lower resolution codebook.

3. The communication device of claim 1, wherein the processing module identifies the codebook entry by:

loading a vocal tract filter with an entry of the one of the plurality of codebooks to produce a loaded filter;

filtering, by the loaded filter, the entry to produce a representative coded signal;

determining error rate of the representative coded signal; and when the error rate is favorable, identifying the entry as the selected codebook entry.

4. The communication device of claim 3, wherein the processing module identifies the codebook entry by:

when the error rate is unfavorable, loading the vocal tract filter with another entry of the one of the plurality of codebooks;

filtering, by the loaded filter, the another entry to produce a second representative coded signal;

determining a second error rate of the second representative coded signal; and when the second error rate is favorable, identifying the other entry as the selected codebook entry.

5. The communication device of claim 3, wherein the processing module further functions to determine the error rate by:

loading a reference vocal tract filter with an entry of a high resolution code book of the plurality of codebooks to produce a reference loaded filter;

filtering, by the reference loaded filter, the entry to produce a reference coded signal; and comparing the representative coded signal with the reference coded signal to produce the error rate.

6. The communication device of claim 1, wherein the input interface comprises at least one of:

a wireless communication interface module; and a wired communication interface module.

7. The communication device of claim 1 further comprises at least one of:

a portable communication device;

a base station; and an access point.

8. The communication device of claim 1 further comprises:

one or more integrated circuits that support one or more of the input interface, the processing module, and the transmitter.

9. A method comprising:

receiving a digital signal that includes a desired digital signal component and an undesired digital signal component;

identifying one of a plurality of codebooks based on the undesired digital signal component;

identifying a code book entry from the one of the plurality of code books based on the desired digital signal component to produce a selected codebook entry;

generating a coded signal based on the selected codebook entry that includes a substantially unattenuated representation of the desired digital signal component and an attenuated representation of the undesired digital signal component;

converting the coded signal into an outbound signal in accordance with a signaling protocol; and transmitting the outbound signal.

10. The method of claim 9, wherein identifying the one of the plurality of code books comprises:

detecting when the undesired digital signal component is a dominant signal component of the digital signal;

when the undesired digital signal component is the dominant signal component, determining magnitude of the undesired digital signal component; and selecting the one of the plurality of codebooks based on an inverse proportional relationship between resolution of a codebook and the magnitude of the undesired digital signal component, wherein the plurality of codebooks includes at least one higher resolution codebook and at least one lower resolution codebook.

11. The method of claim 9, wherein identifying the codebook entry comprises:

loading a vocal tract filter with an entry of the one of the plurality of codebooks to produce a loaded filter;

filtering, by the loaded filter, the entry to produce a representative coded signal;

determining error rate of the representative coded signal; and when the error rate is favorable, identifying the entry as the selected codebook entry.

12. The method of claim 11, wherein identifying the codebook entry further comprises:

when the error rate is unfavorable, loading the vocal tract filter with another entry of the one of the plurality of codebooks;

filtering, by the loaded filter, the another entry to produce a second representative coded signal;

determining a second error rate of the second representative coded signal; and when the second error rate is favorable, identifying the other entry as the selected codebook entry.

13. The method of claim 11, wherein determining the error rate comprises:

loading a reference vocal tract filter with an entry of a high resolution code book of the plurality of codebooks to produce a reference loaded filter;

filtering, by the reference loaded filter, the entry to produce a reference coded signal; and comparing the representative coded signal with the reference coded signal to produce the error rate.

14. The method of claim 9, wherein the desired signal is at least one of:

a signal carried by a wireless channel; and a signal carried by a wireless media.

15. The method of claim 9, executed by at least one of:

a portable communication device;

a base station; and an access point.

16. The method of claim 9, executed by one or more integrated circuits that support one or more of an input interface, a processing module, and a transmitter.

17. The communication device of claim 1, wherein the communication device comprises a cellular phone.

18. The communication device of claim 1, wherein the communication device comprises a Wireless Local Area Network (WLAN) device.

19. The method of claim 15, wherein the portable communication device comprises a cellular phone.

20. The method of claim 15, wherein the portable communication device comprises a Wireless Local Area Network (WLAN) device.

* * * * *